United States Patent [19]

Imperial et al.

[11] Patent Number: 5,017,416

[45] Date of Patent: May 21, 1991

[54] PAPER FOR USE IN ION DEPOSITION PRINTING

[75] Inventors: George R. Imperial, Highland Mills, N.Y.; Hsiang-Ching Kung, Appleton, Wis.; Paul A. Makarewicz, Erie, Pa.; Bonnie J. McCormick, Monroe; Lori S. Slovik, Spring Valley, both of N.Y.

[73] Assignee: International Paper Company, Tuxedo Park, N.Y.

[21] Appl. No.: 422,589

[22] Filed: Oct. 17, 1989

[51] Int. Cl.[5] .................. B32B 9/00

[52] U.S. Cl. .................. 428/195; 428/323; 428/537.5; 428/913; 430/126; 346/135.1

[58] Field of Search .................. 346/135.1, 159, 160.1; 428/195, 323, 537.5, 913; 430/126

[56] References Cited

U.S. PATENT DOCUMENTS

| | | | |
|---|---|---|---|
| 2,471,607 | 5/1949 | Calkin | 204/2 |
| 3,110,621 | 11/1963 | Doggett et al. | 117/218 |
| 3,373,090 | 3/1968 | Alden | 204/2 |
| 3,515,648 | 6/1970 | Chiu et al. | 204/2 |
| 3,639,640 | 2/1972 | Gager | 117/224 |
| 3,793,642 | 2/1974 | Obu et al. | 346/135 |
| 3,956,562 | 5/1976 | Shibata et al. | 428/323 |
| 4,012,292 | 3/1977 | Fujiwara et al. | 204/2 |
| 4,163,075 | 7/1979 | Nakano et al. | 428/328 |
| 4,167,602 | 9/1979 | Serlin | 428/240 |
| 4,259,425 | 3/1981 | Serlin | 430/56 |
| 4,273,602 | 6/1981 | Kosaka et al. | 156/234 |
| 4,397,883 | 8/1983 | Serlin | 427/14.1 |
| 4,444,847 | 4/1984 | Fujioka et al. | 428/522 |
| 4,448,807 | 5/1984 | Serlin | 427/121 |
| 4,894,306 | 1/1990 | Schubring | 428/409 |
| 4,942,410 | 7/1990 | Fitch et al. | 346/135.1 |

OTHER PUBLICATIONS

Ion Deposition Printing: Meeting Universal Paper Requirements with Advanced Printing Tech., Jeffrey J. Carrish, 1st Int. Symposium on Competing in the Business Papers Market of the Future, New York, N.Y., May 1985.

Ion Deposition Technology, Jules P. Farkas, *Packaging*, Feb. 1989.

Ion Printing Technology, John R. Rumsey and David Bennewitz, Journal of Imaging Technology, vol. 12, No. 3, Jun. 1986.

*Primary Examiner*—Patricl J. Ryan
*Attorney, Agent, or Firm*—Luedeka, Hodges, Neely & Graham

[57] ABSTRACT

A paper useful in ion deposition printing. The paper comprises a base sheet or web to which there is applied a coating of a material selected from a group that is at least partially soluble with the binders of the toner employed in the printing process under the conditions of pressure and temperature at which such toner is transferred to the paper in the course of such printing.

6 Claims, 1 Drawing Sheet

PAPER FOR USE IN ION DEPOSITION PRINTING

This invention relates to printing papers and particularly to paper useful in ion deposition printing and with ion deposition printers.

Ion deposition printing involves the steps of: (1) generation of a pattern of ions that is representative of the image to be printed, (2) application of such ions onto a hard dielectric rotatable drum, (3) application of a toner to said drum, such toner being attracted to the drum at only those locations where ions have been deposited, (4) transferring and fixing said toner onto a paper (or other base medium) in an unheated pressure nip, (referred to at times as "transfixation") and (5) erasing the latent image from the drum. The toner employed in such printing operations comprises particulate matter, e.g. carbon particles, dispersed in a binder, most commonly an ethylene or ethylene-vinyl acetate based polymeric binder. As used herein the term "binder" shall include a single material, e.g., polyethylene or a combination of materials, e.g. ethylene and vinyl acetate, unless otherwise indicated.

Reportedly, there is a large range of acceptable materials onto which an image may be developed, i.e. printed, when employing ion deposition printing. It has been stated that the range extends from tissue paper, through vinyl, to 20 point tag stock. One of the major applications of ion deposition printing, however, is in the office market, including electronic data processing operations. In these operations, it is desired, and at times required, that the base material be paper. Such paper preferably is reasonably durable and must accept and retain the toner which is transferred thereto in the cold pressure nip of the ion deposition printer.

Ion deposition printing allows the use of relatively less complicated printers, hence represents considerable savings both in the initial capital investment in equipment and in the costs associated with maintenance. One of the major limitations of ion deposition printing, however, has been the inability to retain the toner on the paper following transfixation. Whereas the "cold" (i.e. unheated) pressure nip transfixation concept functions quite satisfactorily in certain circumstances, when the base material onto which the toner is applied is a paper in the nature of 13 to 24 lb bond printing papers (xerography-type papers) that are commonly and readily available in office environments, the toner fails to adhere to the paper sufficiently to withstand normal handling of the printed pages, and especially the toner flakes off the paper when the paper is folded or creased. Furthermore, the toner can be easily lifted from the paper by adhesive tape, e.g., Scotch 810 brand tape. This limitation is believed to be one reason why ion deposition printing has enjoyed only relatively limited acceptance in the office environment, which is recognized to be a very large potential market for such technology.

In accordance with the present invention, it has been found that the adhesion of the toner applied to a paper base material in the course of ion deposition printing is enhanced by first applying to the paper prior to its introduction into an ion deposition printer, a coating containing a polymeric latex that exhibits a suitable solubility with the binder of the toner when the toner and such coating are brought together in the unheated pressure nip of the printer. The preferred coating is securely bonded to the paper substrate and by reason of its solubilization with the binder of the toner, the toner also becomes securely bonded to the paper substrate. This coating exhibits a glass transition temperature, (Tg) in the range of between about −30° C. and about +30° C., with the preferred coating having a glass transition temperature between −10° and +20° C., and a solubility parameter of between about 8 and about 12.

Accordingly, it is an object of the present invention to provide a paper useful in ion deposition printing which provides enhanced adhesion of the toner to the paper. It is another object to provide a paper useful in ion deposition printing which is compatible with existing ion deposition printers. These and other objects of the invention will be recognized from the description contained herein, including the drawings in which.

Figure 1:
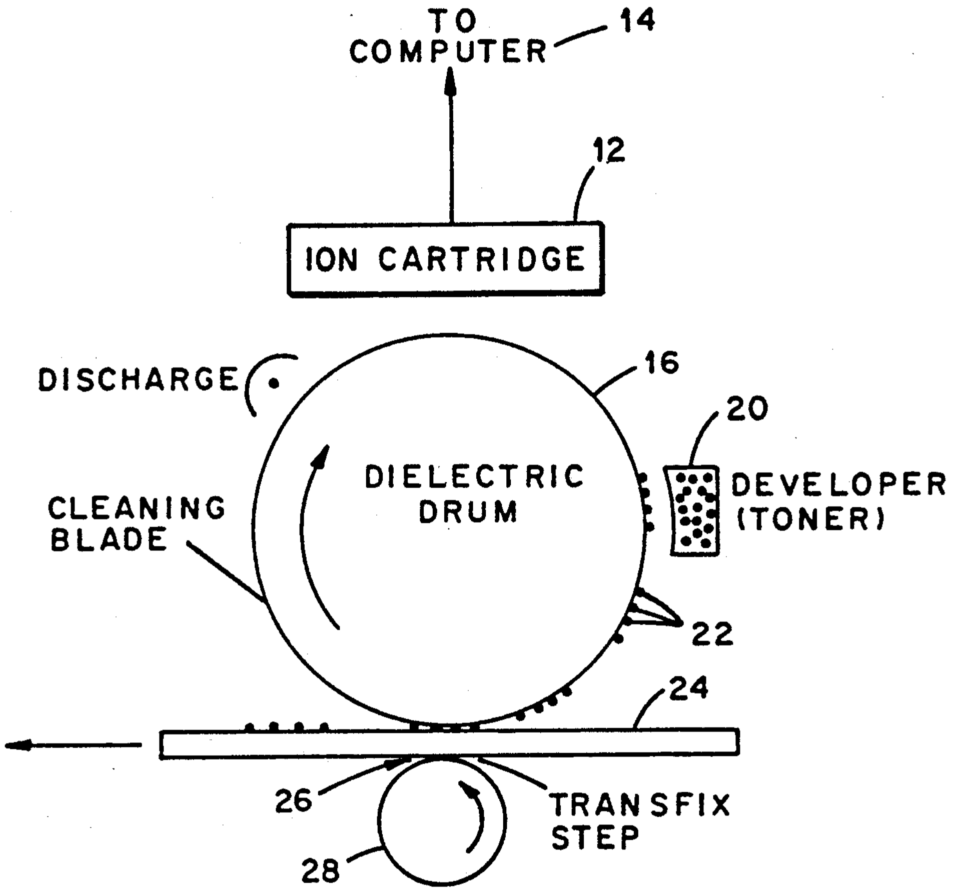
FIG. 1 is a diagrammatic representation of an ion deposition printer.

With reference to FIG. 1, in ion deposition printing, the apparatus employed comprises an ion cartridge 12 which is electrically connected to and controlled by the input from a computer 14, for example. This ion cartridge 12 is disposed contiguous to a rotatable hard, and very durable drum 16 fabricated of a dielectric material (at least on the outer surface thereof). Ion streams generated by the ion cartridge and representative of the image produced by the computer (or like source) are directed onto the drum surface 18. This selectively charged drum surface is rotated past a source of toner 20 and particles 22 of the toner become attached to the drum surface. The drum continues to rotate so that the surface thereof, with the toner particles thereon, is caused to contact a sheet of paper 24 in the nip 26 between the drum and a pressure roll 28. In this nip 26, the toner is cold fused to the paper and thereby transferred from the drum to the paper. Notably, and in contrast to xerography and like electrophotography processes, the fixation of the toner in ion deposition printing is accomplished by pressure, using a "cold" roll. No thermal fusion is employed as in xerography, etc. Pressure of about 100–250 pli or greater is developed in the nip.

The toner employed in ion deposition printing commonly is of the monocomponent type. That is, the toner comprises particulate colored matter, e.g. carbon and iron oxide particles, carried in a binder. Binders commonly used are polyethylene or polyethylene/vinyl acetate, although other polymer types and combinations thereof may also be employed as toner binders. It is the cold fusion of these binders that develops the adhesion of the colored particulates to the paper.

Suitable paper substrate for use in ion deposition printing has relatively few required specifications. The common xerographic bond type papers, at times referred to as "plain" papers, have been used in office-type printing applications heretofore. As noted, however, these paper types, without more, do not provide satisfactory adhesion of the toner particulates to the paper. In one embodiment of the present invention, improved adhesion of the toner to the paper is achieved by applying to a paper substrate, before introduction of the paper to an ion deposition printer, a coating that is capable of solubilizing with the binder of the toner under conditions of cold transfixation as described hereinabove, that is, under conditions of about 100–250 pli of pressure, applied as in the nip between two rolls, and at about room temperature.

In one embodiment of the present invention where the anticipated toner comprises a polymeric binder in the nature of polyethylene, the present paper preferably is provided with a coating of a polymeric latex selected from the class comprising acrylic latices, styrene butadiene latices., and/or combinations thereof. Where the binder is polyethylene/vinyl acetate based, the preferred coating applied to the paper is a polymeric latex comprising ethylene vinyl copolymers. One primary key to the selection of the polymeric latex to be coated onto the paper is the solubility parameter of such polymeric latex. Solubility parameters are a measure of the compatibility of polymers. The solubility parameter is defined as the square root of the cohesive energy which, in turn, is numerically equal to the potential energy of one cc of material. The solubility parameter is useful in predicting the solubility of polymers in solvents and may be used as an aid in predicting the mutual solubility of polymers. Specifically, it has been found that the polymeric latex for use as the paper coating should have a solubility parameter in the range of between about 8 and about 12. Polymeric latices having a solubility parameter of less than about 8 or greater than about 12 provide negligible enhancement of the adhesion of the toner to the paper. Preferably, the solubility parameter of the polymeric latex is between about 8 and about 10 for optimum adhesion enhancement.

In a similar manner, the polymeric latex useful in the present paper exhibits a glass transition temperature (Tg) of about −30° C. and not materially greater than about +30° C. The exact reason why this range of glass transition temperatures is most effective is not known with certainty. However, it is felt that the softer polymeric latex coating on the paper permits better cold flow, hence enhanced toner adhesion. It has been noted that the preferred adhesion of the toner to the paper occurs when the polymeric latex has a glass transition temperature that is nearer the central portion of such range so the glass transition temperatures of about −10° C. to +20° C. are preferred to temperatures nearer the extremes of the high or the low sides of the glass transition temperature range.

The concept therefore employed here is to match as closely as possible the solubility parameter of the coating material to the solubility parameter of the toner binder, with the further stipulation that the Tg of the coating material remain within the confines of the stated Tg limitations.

Examples of polymer latices possessing the above Tg and solubility parameter restrictions which have been found to provide improved toner adhesion to paper include the following:

methyl, ethyl, butyl and higher alkyl acrylates
methyl methacrylate
ethylene vinyl acetate
vinyl acetate
vinyl acetate/acrylate copolymers
ethylene acrylic acid
ethylene/vinyl chloride emulsions
vinyl acrylic copolymers
vinyl chloride/acrylic copolymers
vinylidene chloride/acrylic copolymers
styrene acrylics
styrene butadiene
acrylonitrile
polyvinyl alcohols As noted above when employing toner having a polyethylene binder, it has been found that the most effective polymeric latices are the acrylic latices containing polymethyl, polyethyl or polybutyl acrylate. Higher acrylates may be employed, but are not readily commercially available in the latex form. When employing a toner having a polythylene/vinyl acetate binder, the most effective polymeric latices are the ethylene/vinyl copolymers.

The present invention is useful with a wide variety of substrates for example transparencies and paper. Preferably the paper is of the bleached type, but such is not required in that certain unbleached papers may be coated in accordance with the present invention and thereafter be successfully printed by means of ion deposition printing, e.g. certain of the lighter weights of card stock or label stock. For office environments, however, the bleached papers are preferred. These may be derived from either acid or alkali paper formation processes, bleached kraft papers being especially desirable. The papers may have added thereto during or subsequent to their formation, the usual additives or fillers such as starch, etc. In particular, the preferred papers are those which do not exhibit curl when passed through the nip defined by the printer drum and the pressure roll. Such paper is not limited to the wood species. However, papers formed from softwoods (e.g. southern pine) or hardwoods (e.g. maple, birch) may be employed. Likewise papers formed from fibers such as eucalyptus, bagasse, etc. may be employed.

Figure 2:
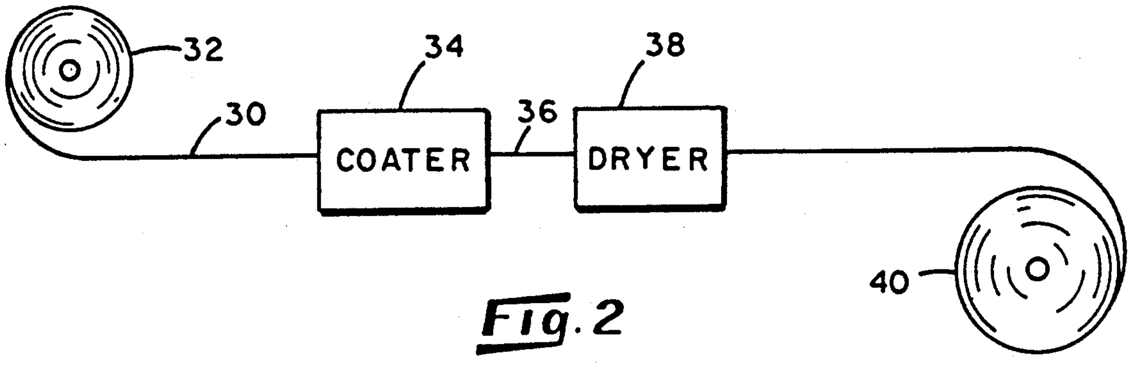
FIG. 2 is a schematic representation of a system for applying a coating to a paper web in accordance with the present invention.

In one embodiment of a process for applYing the present coating to a paper substrate, (see FIG. 2) the paper 30, in web form, is fed forwardly from a roll 32 to a coater 34 where the coating is applied. Preferably, the paper web 30 is coated on both of its opposite flat surfaces so that the paper may be fed into an ion deposition printer with either surface of the paper facing up, that is either surface of the paper is suitable for receiving the toner from the printing drum. Therefore, preferably, the coater 34 is a size press of the type well known in the paper industry for applying coatings to web surfaces. Alternatively, the coating may be applied by any of several other known coating techniques, such as spraying, brushing, foaming, roll coating, etc. The primary object in the coater is to apply a uniform coating of the polymeric latex to at least one, and preferably both, surfaces of the paper. The coated paper web 36 is dried as by passing the coated web through a heated chamber 38 and then collected in a roll 40.

The polymeric latex is prepared for application to the paper by diluting the latex to that consistency which will result in the deposit of between about 1.0 lb to about 5.0 lb of latex solids onto each 3,000 $ft^2$ of paper surface. The coating which results from the application of latex in this range of coating weights has been found to accept and fuse with essentially 100% of the toner disposed on the printer drum. Such coatings do not "bleed" onto the drum, nor do they present any other adverse effect upon the printer, such as jamming of the paper as it is fed into and through the printer.

In Tables 1 and 2 there are presented data relative to several polymeric latices which have been used in the coating of the present invention. In each of the examples presented in Table 1, the latex was coated onto a non-surface treated xerographic grade paper, approximately $8\frac{1}{2}'' \times 11''$ having a basis weight of 46 lbs/3,000 $ft^2$. In each example, the latex was diluted to that consistency which resulted in the application of the noted coating weights. Further, in each example, the coated paper sheet was oven-dried at 110° C. for 2 minutes prior to passing the sheet through a CIE 3000 L2 ion deposition printer operated in accordance with the standard manufacturer's recommendations. The toner was supplied by the printer manufacturer and designated as TNRI (polyethylene-based).

The data presented in Table 2 were obtained from base paper coated on a pilot size press. The base paper was a nonsurface treated bleached Kraft sheet with a 46 lbs/3,000 $ft^2$ basis weight. The web width was 12", and the size press was run at approximately 200 fpm. The latex, or coating formulation, was diluted and applied to both sides of the web to give the coat weights listed in Table 2. After coating, the paper was dried to 4–5% moisture by 5 steam filled can dryers which followed the size press. The paper was then cut to $8\frac{1}{2}\times 11''$ sheets and passed through a Delphax S-6000 ion deposition printer. The toner employed was RP-1329 (Coates) (polyethylene/vinyl acetate-based).

The customary tests for adhesion of toner to a printed substrate include (1) the Scotch tape test, and (2) the fold test. In the tape test, a strip of 3M Scotch 810 brand tape is pressed onto the printed sheet and then removed. The percent toner retention is calculated as the ratio of the final diffused reflection density (after tape pull) and the initial diffused reflection density (before tape pull). The quantity of toner which adheres to the tape and which is therefore removed from the printed sheet is noted visually. Excellent adhesion of the toner to the paper is recorded for the test paper where essentially no toner is removed. Poor or unacceptable adhesion is indicated when no more than about 45% to 60% of the toner retention is obtained. In the fold test (also referred to as the "crease" test), the printed paper is folded and creased as by passing the folded edge of the paper through the thumb and forefinger to emphasize the crease, and thereafter unfolding the paper and either visually checking for dislodged toner or by calculating the percent toner retention as the ratio of the final diffused reflection density (after crease test) and the initial diffused reflection density (before crease test). Any substantial dislodgement of toner due to the creasing is considered to be unacceptable. The printed papers described in Tables 1 and 2 were subjected to the Scotch tape test and crease tests. The results of the tape tests are given in the Tables. The results of the crease tests as observed visually generally paralleled the results of the tape tests at the moderate Tg values.

TABLE 1

| | | | | | Coating | |
|---|---|---|---|---|---|---|
| Example | Commerical Designation | Chemical Designation | Tg (°C.) | Solubility Parameter | Toner Retention Results (%) | Coat Weight (#/3000 $ft^2$) |
| 1 | Control**** | None | — | — | 45 | — |
| 2 | Fuller* PD201F | Vinyl acrylic/carboxylated | 16 | — | 64 | 1 |
| 3 | Fuller PD661 | Poly(butylacrylate-methylmethacrylate) | −28 | 8.7 | 75 | |
| 4 | Fuller PDo62 | Polyvinyl acetate | 39 | 9.6 | 62 | 1 |
| 5 | Airflex*** 100HS | Vinyl acetate ethylene copolymer; nonionic | 5 | — | 62 | 1 |
| 6 | Airflex 300 | Vinyl acetate ethylene | 18 | — | 77 | 1 |
| 7 | Airflex 4530 | Ethylene vinyl chloride | 30 | 9.7 | 66 | 1 |
| 8 | Airflex 4814 | Ethylene vinyl chloride | 14 | — | 71 | 1 |
| 9 | Air Products & Chemicals | Vinyl acetate | 4 | 9.6 | 62 | 1 |
| 10 | Rhoplex E1242 | Acrylic emulsion | 20 | — | 64 | 1 |
| 11 | Rohm & Haas | Acrylic latex | 0 | — | 89 | 1 |
| 12 | Rohm & Haas | Acrylic latex | 0 | — | 98 | 2 |
| 13 | Synthemul 40552 | Vinyl acetate - acrylate copolymer | 14 | — | 83 | 1 |
| 14 | Synthemul 40551 | Vinyl acetate - acrylate copolymer | 0 | — | 83 | 1 |
| 15 | Vinol 107 | Polyvinyl alcohol | — | 12.6 | 62 | 1 |
| 16 | B. F. Goodrich | Vinyl chloride - acrylate copolymer | 7 | — | 67 | 1 |
| 17 | Goodrite 1800 × 73 | Styrene/butadiene latex | 10 | 8.2 | 83 | 1 |
| | | Dimethyl siloxane | — | 7.5 | 36 | 1 |

Remarks:
*H. B. Fuller Company, Polymer Division, Blue Ash, OH 45242
**Carboxylated
***Air Products & Chemicals, Inc., Polymer Chemicals Division, Allentown, PA 18105
****Xerocopy paper having a basis weight of 46#/3000 $ft^2$ (without coating)

TABLE 2

| Example | Commercial Designation | Chemical Designation | Tg (°C.) | Coat Weight #/3,000 $Ft^2$ | toner Retention Results % |
|---|---|---|---|---|---|
| 20 | Control - Xerox 4024 | Paper | — | — | 59.5 |
| 21 | Adcote 37WW468[1] | Modified poyethylene | — | 4.8 | 91.0 |
| 22 | Adcote X19-1[1] | Ethylene acrylic acid | — | 4.8 | 95.5 |
| 23 | Airflex 154[2] | Vinyl chloride/ethylene/vinyl acetate | — | 0.8 | 78.8 |
| 24 | Airflex 154[2] | Vinyl chloride/ethylene/vinyl acetate | — | 2.0 | 84.0 |
| 25 | Airflex 154[2] | Vinyl chloride/ethylene/vinyl acetate | — | 3.5 | 84.0 |
| 26 | Airflex 154[2] | Vinyl chloride/ethylene/vinyl acetate | — | 4.0 | 92.0 |
| 27 | Airflex 4514[2] | Ethylene/vinyl chloride | 14 | 4.0 | 92.5 |
| 28 | Airflex 100HS[2] | Vinyl acetate/ethylene | 7 | 4.0 | 89.5 |

TABLE 2-continued

| Example | Commercial Designation | Chemical Designation | Tg (°C.) | Coat Weight #/3,000 Ft[2] | toner Retention Results % |
|---|---|---|---|---|---|
| 29 | Dow 615A[3] | Carboxylated styrene butadiene | 20 | 1.9 | 85.5 |
| 30 | Dow 620NA[3] | Carboxylated styrene butadiene | 12 | 2.2 | 86.5 |
| 31 | Joncryl 89/ Joncryl 74[4] Blend | Styrenated acrylic | — | 4.6 | 88.0 |
| 32 | National Starch 25-1140[5] | Polyvinyl acetate/ acrylic | −20 | 5.3 | 94.5 |
| 33 | Penford Gum 270[6]/ Vinol 540[2] blend | Hydroxyethylated starch/ polyvinyl/alcohol | — | 3.2 | 78.3 |
| 34 | Polyco 2150[7] | Polyvinyl acetate | 30 | 4.3 | 88.0 |
| 35 | Rhoplex GL-618[7] | Acrylic | 27 | 4.3 | 83.5 |
| 36 | Vinac 810L[2] | vinyl acetate | 41 | 4.0 | 90.5 |

[1]Morton Thiokol, Inc., Chicago, IL 60606-1292
[2]Air Products & Chemical, Inc., Polymer Chemicals Division, Allentown, PA 18105
[3]Dow Chemical, U.S.A., Coatings and Resins Dept., Midland, MI 48640
[4]S. C. Johnson & Son, Inc., Racine, WI 53403-5011
[5]National Starch & Chemical Corp., Bridgewater, NJ 08807
[6]Penick & Ford, Ltd., Cedar Rapids, IA 52406
[7]Rohm & Haas Company, Philadelphia, PA 19105

As shown in Tables 1 and 2, enhanced adhesion of the toner to the paper sheets coated as disclosed herein occurs when the polymeric latex of the coating exhibits a solubility parameter in the range of between about 8 and about 12 and a Tg between about −30° C. and +30° C. Further, when the binder of the toner is of the polyethylene/vinyl acetate type or the polyethylene type, the preferred latices are the ethylene/vinyl copolymers, or the lower acrylates, that is methyl, ethyl and butyl acrylates, respectively. The good results have been noted with coated paper webs having coating weights of from about 1 lb/3000ft$^2$ to about 5 lbs/3000ft$^2$.

What is claimed:

1. A sheet or web useful in ion deposition printing employing a polymeric-based toner and comprising a sheet or web substrate, a coating on at least one surface of said substrate, said coating comprising a polymeric latex having a Tg of about −30° C. to about +30° C. and a solubility parameter in the range of about 8 to about 12 with respect to the binder of the toner employed int he ion deposition printing wherein when said toner disposed on said material is subjected to transfixation in an unheated nip, at least greater then 80% of said toner is retained on said material after said toner-bearing material has been subjected to a tape test, and wherein said polymeric latex is present on said substrate in an amount of between about 1.0 and about 5 lbs. per 3,000 ft$^2$ of substrate surface.

2. The sheet or web of claim 1 wherein said toner comprises a polyethylene binder and said polymeric latex coating is an acrylic polymer.

3. The sheet or web of claim 2 wherein said polymeric latex coating is selected from the group consisting of polymethylacrylate, polyethylacrylate, and polybutylacrylate.

4. The sheet or web of claim 1 wherein said toner comprises a polyethylene/vinyl acetate binder and said polymeric latex coating is ethylene/vinyl copolymers.

5. The sheet or web of claim 1 wherein the toner applied to said paper in the course of ion deposition printing thereon is not materially dislodged when said printed paper is creased.

6. The sheet or web of claim 1 wherein said coating is applied to both surfaces of said paper.

* * * * *

UNITED STATES PATENT AND TRADEMARK OFFICE

CERTIFICATE OF CORRECTION

PATENT NO. : 5,017,416

DATED : May 21, 1991

INVENTOR(S) : George R. Imperial, Hsiang-Ching Kung, Paul A. Makarewicz, Bonnie J. McCormick and Lori S. Slovik It is certified that error appears in the above-identified patent and that said Letters Patent is hereby corrected as shown below:

Column 3, line 6, after "latices" delete --.--.

Column 4, line 29, delete "applYing" and insert --applying-- therefor.

In Table 1, Columns 5 and 6, in Example 6 under heading Chemical Designation, after "ethylene" add --copolymer; nonionic--.

In Table 2, Columns 5 and 6, in heading of 6th column, delete "toner" and insert --Toner-- therefor.

Column 7, Claim 1, line 43, delete "int he" and insert --in the-- therefor.

Column 8, Claim 1, line 22, delete "then" and insert --than-- therefor.

Signed and Sealed this

Twentieth Day of April, 1993

*Attest:*

MICHAEL K. KIRK

*Attesting Officer*

*Acting Commissioner of Patents and Trademarks*